Oct. 29, 1968 V. H. HILDEBRANT 3,407,861
TRACTION STUD FOR VEHICLE TIRES AND METHOD OF MAKING
Filed April 4, 1966

INVENTOR.
VERNON H. HILDEBRANT
BY
J. Warren Kinney Jr.
ATTORNEY

United States Patent Office 3,407,861
Patented Oct. 29, 1968

3,407,861
TRACTION STUD FOR VEHICLE TIRES AND
METHOD OF MAKING
Vernon H. Hildebrant, Morrow, Ohio, assignor, by mesne assignments, to Studebaker Corporation, a corporation of Michigan
Filed Apr. 4, 1966, Ser. No. 540,074
2 Claims. (Cl. 152—210)

ABSTRACT OF THE DISCLOSURE

A tire stud having an elongated tubular body with a bore therethrough and a head portion at one end thereof. The bore tapers from the head end toward the opposite end of the body. An insert is positioned in the bore such that an end thereof extends outwardly from said opposite end of the body. An obstruction in the bore precludes axial movement of the insert toward the head end of the body.

---

This invention relates to a traction stud for vehicle tires made of rubber or rubber-like material. The stud generally is of metal, and is embedded in the tire casing in such a manner as to expose an end thereof at the tread of the tire, to engage a road surface and thereby augment the traction and non-skid factors of the tire.

An object of the invention is to provide an improved traction stud, and method of assembly, whereby a tire may be armored with a multiplicity of the studs at minimal cost.

Another object of the invention is to provide an improved traction stud having extraordinary wear-resistant characteristics.

A further object is to provide a rapid and economical method of fabricating traction studs for vehicle tires, with substantial savings of time and labor.

The foregoing and other objects are attained by the means described herein and illustrated upon the accompanying drawing, in which.

Figure 1:
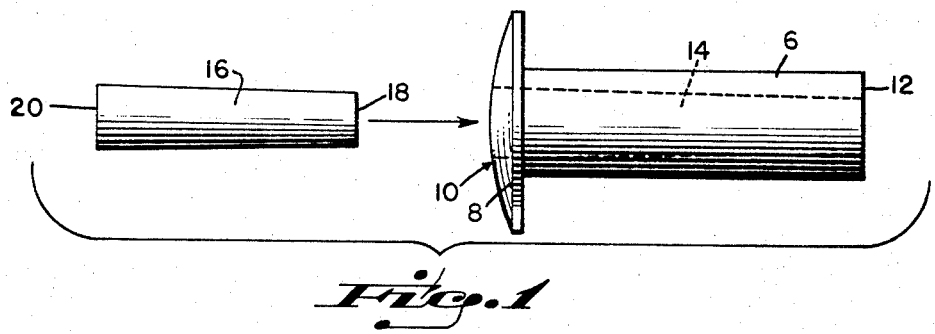
FIG. 1 is an exploded side elevational view, on enlarged scale, of the improved traction stud components to be assembled in accordance with the invention.

Headed traction studs are usually applied to rubber tires by one of two procedures, namely, (1) by molding them into the tread portion of the tire during the vulcanizing procedure, or (2) by inserting the studs into holes formed in the tread after the tire has been removed from the vulcanizing mold. The traction studs of the present invention may be applied to a tire by either method mentioned, or by methods otherwise practiced in the art. What is important to the present invention, is the stud itself and the method of assembling it.

In the drawing, the stud body is seen to consist of an elongate, substantially cylindrical shank 6 having at one end an enlarged head 8, the shank and the head being preferably formed from a single piece of metal. The head may be substantially flat, or possibly outwardly crowned as at 10, and resides in a plane which is substantially perpendicular to the shank axis. The stud body may be formed of a relatively hard metal, such as steel, and is preferably such as will resist rusting, corrosion, bending and fragmentating under road conditions ordinarily encountered by vehicle tires. The shank has a nose end 12 which is opposite the head 8.

As will be understood, the stud when embodied in a vehicle tire will extend substantially radially of the tire, with head 8 embedded in the material of the tire tread, while the nose end 12 extends radially outwardly to a position near the exposed surface of the tread. The nose end 12, in a studded tire as manufactured, need not be extended outwardly beyond the tread of the tire. Head 8, of course, will be anchored in the tread material close to the carcass of the tire.

Figure 2:
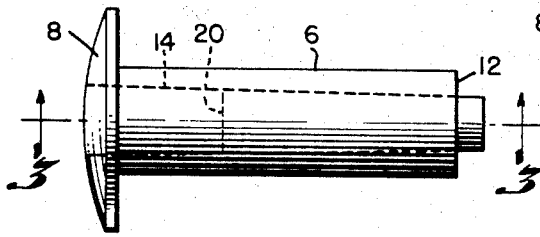
FIG. 2 is a side elevational view of the stud, in partly completed condition.
Figure 3:
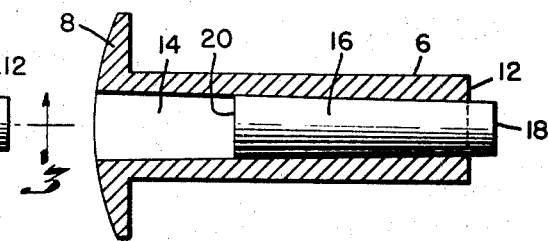
FIG. 3 is a sectional view taken on line 3—3 of FIG. 2.
Figure 4:
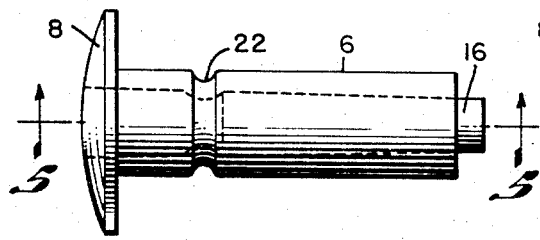
FIG. 4 is a side elevational view of the improved stud in completely assembled condition.
Figure 5:
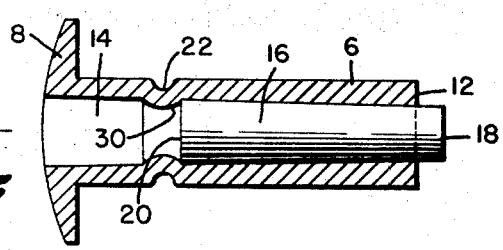
FIG. 5 is a sectional view taken on line 5—5 of FIG. 4.

The shank of the stud is provided with a through axial bore or passageway 14 open at its opposite ends. The bore or passageway 14 is preferably uniformly tapered, from a maximum diameter at the headed end of the shank to a minimum diameter at the other end. The direction of taper is of primary importance to the present invention, since it limits the extent to which a core or insert 16 may project beyond the nose end 12 of the stud shank. The taper of bore or passageway 14 is slight by preference, so that the correspondingly tapered insert 16 will remain wedged and accurately supported within the bore after having been driven to the home position of FIG. 2, with the leading end of the insert projected beyond the nose end of the stud body. The taper may be of the order of 2 to 5 degrees angularity to the axis of the shank, for example.

In accordance with the present invention, the core or insert 16 is formed of a very hard and durable wear-resistant material, such as cemented tungsten carbide or equivalent. The insert may be in the form of a tapered pin, the leading end 18 of which is smaller in diameter than the butt end 20. The smaller leading end 18 of the pin or insert is the end which projects beyond the nose end 12 of the stud body, and therefore receives the road wear. The larger butt end 20, in the assembled stud, resides within bore 14 at a distance from nose 12. As previously stated, the bore 14 and pin or insert 16, are complementarily tapered on a slight angle, the tapers being so related that only a limited portion of the leading end 18 of the pin projects beyond the nose end 12 of the stud body when the pin is driven in from the head end of the body.

The method of assembly of the traction stud is very simple, rapid, and economical, as follows. The smaller end 18 of pin or insert 16 easily enters the enlarged head end of bore 14; then a driving force is applied to the butt end of the pin, to introduce it into and then advance it along the bore to extend the leading end of the pin a desired distance beyond the nose end 12 of the stud body. Finally, the stud body is swaged at a location 22, between the head 8 and the butt end of the inserted pin, to provide an abutment 30 interiorily of the bore which is engaged by the butt end 20 of the insert to positively lock the pin 16 against retrograde movement.

It is noted that the stud body should be longer than the pin or insert 16, and should admit the pin from the head end forwardly during assembly. Preferably, though not necessarily, the outer wall of the stud body is substantially cylindrical in form, and head 8 may conveniently be disc-like, in the interest of economical fabrication by automatic machinery. The bore 14 and pin or insert 16, may best be circular in cross-section, although other cross-sectional shapes might be adopted if considered desirable.

As a modification, the stud bore 14 and the pin or insert 16, might be cylindrical rather than conical in shape, in which event, the pin or insert is secured in desired relation within and relative to bore 14 by the application of radial compressive forces to the body shank.

It is to be understood that various modifications and changes may be made in the structural details and in the method of assembly disclosed, without departing from the spirit of the invention.

What is claimed is:

1. A tire stud comprising: an elongate, substantially cylindrical body portion, one end of which is provided with an enlarged anchoring head, said body having a through bore extending lengthwise thereof; a hardened elongate insert received within said bore with one end thereof projecting beyond that end of the body remote from the head; and means permanently securing said insert within said bore and against relative endwise movement therewith, the body bore being uniformly tapered to converge from a maximum diameter adjacent the headed end of the body to a minimum diameter at the opposite end, the insert having a taper which is complementary to the taper of said bore, the overall length of the insert being substantially less than the length of the body, with the smaller end of the insert projecting beyond that end of the body remote from the head, and with further axial movement of the insert toward the unheaded end of the stud body being precluded by frictional contact between the adjacent faces of the bore and the insert, and wherein axial movement of the insert toward the headed end of the body is precluded by an obstruction in said bore which abuts the head-adjacent-end of the insert.

2. A tire stud as called for in claim 1, wherein the bore is provided with an integral abutment which engages the larger end of the insert for thereby positively precluding axial movement of the insert relative to and within said bore.

References Cited

UNITED STATES PATENTS

| | | | |
|---|---|---|---|
| 2,467,418 | 4/1949 | Alexiadis | 152—210 |
| 3,125,147 | 3/1964 | Hakka | 152—210 |
| 3,220,455 | 11/1965 | Sowko | 152—210 |
| 3,230,997 | 1/1966 | Carlstedt | 152—210 |

FOREIGN PATENTS

| | | |
|---|---|---|
| 381,654 | 1/1908 | France. |

ARTHUR L. LA POINT, *Primary Examiner.*

C. B. LYON, *Assistant Examiner.*